United States Patent
Holung et al.

(10) Patent No.: US 9,281,506 B2
(45) Date of Patent: Mar. 8, 2016

(54) BATTERY CELL CONTAINMENT AND VENTING

(75) Inventors: Joseph Anthony Holung, Wake Forest, NC (US); Tin-Lup Wong, Chapel Hill, NC (US); Bouziane Yebka, Cary, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 1429 days.

(21) Appl. No.: 12/327,132

(22) Filed: Dec. 3, 2008

(65) Prior Publication Data
US 2010/0136386 A1    Jun. 3, 2010

(51) Int. Cl.
| | |
|---|---|
| *H01M 2/10* | (2006.01) |
| *H01M 2/12* | (2006.01) |
| *H01M 10/643* | (2014.01) |
| *H01M 10/617* | (2014.01) |
| *H01M 10/658* | (2014.01) |
| *H01M 6/42* | (2006.01) |
| *H01M 10/625* | (2014.01) |
| *H01M 10/623* | (2014.01) |
| *H01M 10/613* | (2014.01) |

(52) U.S. Cl.
CPC ............ *H01M 2/1094* (2013.01); *H01M 2/105* (2013.01); *H01M 2/1229* (2013.01); *H01M 2/1241* (2013.01); *H01M 10/617* (2015.04); *H01M 10/643* (2015.04); *H01M 10/658* (2015.04); *H01M 6/42* (2013.01); *H01M 10/613* (2015.04); *H01M 10/623* (2015.04); *H01M 10/625* (2015.04)

(58) Field of Classification Search
CPC ...................................................... H01M 2/1094
USPC ...................................................... 429/82–89
See application file for complete search history.

(56) References Cited

U.S. PATENT DOCUMENTS

| | | | | |
|---|---|---|---|---|
| 3,784,411 | A * | 1/1974 | Ciliberti, Jr. | 429/157 |
| 3,877,991 | A * | 4/1975 | Fujikawa | 429/82 |
| 3,943,007 | A * | 3/1976 | Lebrun | 429/87 |
| 4,121,017 | A * | 10/1978 | Dougherty et al. | 429/7 |
| 4,149,649 | A * | 4/1979 | Szego | 220/88.2 |
| 5,563,364 | A * | 10/1996 | Alhamad | 102/303 |
| 5,759,714 | A * | 6/1998 | Matsufuji et al. | 429/336 |
| 6,027,831 | A * | 2/2000 | Inoue et al. | 429/181 |
| 7,189,473 | B2 * | 3/2007 | Smith et al. | 429/82 |
| 8,012,619 | B2 | 9/2011 | Carlson et al. | |

(Continued)

FOREIGN PATENT DOCUMENTS

| | | | |
|---|---|---|---|
| JP | 2005317455 A | * | 11/2005 |
| JP | 2008269954 A | * | 11/2008 |
| WO | WO 2008044430 A1 | * | 4/2008 |

OTHER PUBLICATIONS

JP 2005-317455 A JPO Machine Translation.*
Machine Translation of WO 2008/044430 A1.*

(Continued)

*Primary Examiner* — Barbara Gilliam
*Assistant Examiner* — Robert S Carrico
(74) *Attorney, Agent, or Firm* — John L. Rogitz; John M. Rogitz

(57) ABSTRACT

A battery has a casing holding plural cells and a mesh wrapped around the cells to contain pieces of an exploding cell within the casing. To prevent overpressurization of the casing from the gas emitted by an exploding cell, a pressure relief feature is provided that allows gas to pass through battery casing.

29 Claims, 2 Drawing Sheets

(56) References Cited

U.S. PATENT DOCUMENTS

| | | | |
|---|---|---|---|
| 8,163,408 B2 | 4/2012 | Holung et al. | |
| 8,298,693 B2 | 10/2012 | Holung et al. | |
| 8,512,893 B2 | 8/2013 | Carlson et al. | |
| 2003/0082439 A1* | 5/2003 | Sakakibara | 429/120 |
| 2006/0251962 A1* | 11/2006 | Kim | 429/130 |
| 2007/0154789 A1* | 7/2007 | Chang et al. | 429/130 |
| 2008/0042618 A1* | 2/2008 | Cromer et al. | 320/134 |
| 2008/0196956 A1* | 8/2008 | Koenekamp et al. | 180/65.4 |
| 2010/0047673 A1* | 2/2010 | Hirakawa et al. | 429/54 |

OTHER PUBLICATIONS

Jeremy Robert Carlson, Larry Glenn Estes, Joseph Anthony Holung, Timothy Humphrey, Tin-Lup Wong, Bouziane Yebka, "Establishing Space Between End of Center Gas Pipe in Battery and Bottom of Battery Can" file history of related U.S. Appl. No. 12/033,339, filed Feb. 19, 2008.

Joseph Anthony Holung, Tin-Lup Wong, Bouziane Yebka, "Battery with Pressure Relief Channel," file history of related U.S. Appl. No. 12/252,794, filed Oct. 16. 2008.

Joseph Anthony Holung, Tin-Lup Wong, Bouziane Yebka, "Battery with Pressure Relief Channel," file history of related U.S. Appl. No. 13/427,186, filed Mar. 22, 2012.

Jeremy Robert Carlson, Larry Glenn Estes, Joseph Anthony Holung, Timothy Humphrey, Tin-Lup Wong, Bouziane Yebka, "Mitigating Rupture and Thermal Cascading of Battery Cells by Judicious Arrangement of Cells Inside a Pack" file history of related U.S. Appl. No. 12/049,337, filed Mar. 16, 2008.

* cited by examiner example system

BATTERY CELL CONTAINMENT AND VENTING

FIELD OF THE INVENTION

The present invention relates generally to battery cell containment and venting in applications such as portable computers and motor vehicle.

BACKGROUND OF THE INVENTION

Batteries, including Lithium-Ion batteries, are extensively used in laptop computers, cellular phones, and many other types of electrical devices. Particularly with respect to the preferred Lithium-Ion batteries, these batteries may be made at a relatively low cost and have a relatively high electrical storage capacity.

As electrical devices become more complex and thus consume more electricity, such as is the case with cellular phones, manufacturers have included high powered batteries such as Lithium-Ion batteries with their product. However, as understood herein the high powered battery cells included in such batteries may cause unintended battery malfunctions. Examples of such malfunctions include battery cell explosions, ruptures, and venting (a forced expulsion of gases).

SUMMARY OF THE INVENTION

A battery has plural battery cells and an outer casing holding the cells. A mesh surrounds the cells to contain cell parts should a cell explode. The mesh is porous to gas emitted by the cells such that the gas can pass through the mesh to the casing. At least one pressure relief feature is arranged to permit gas to pass through the casing when pressure in the casing exceeds a threshold.

In some embodiments the casing has at least one first portion and a second portion, with the first portion being structurally weaker than the second portion to establish the pressure relief feature. In other embodiments the pressure relief feature is established by at least one pressure relief valve, e.g., a one-way valve.

The mesh may be fire resistant. Furthermore, thermal barriers may be disposed between adjacent cells. A thermal barrier may include a ceramic plate. The battery may be used in a computer or a motor vehicle.

In another aspect, a battery includes a mesh material wrapped around at least part of the battery and at least one relief feature capable of allowing gas to pass from a battery cell through battery casing.

In another aspect, a method to contain pieces of an exploding battery cell within a battery casing while preventing overpressurization of the casing includes constraining the cell in the casing using structure within the casing and providing a gas vent through the casing.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
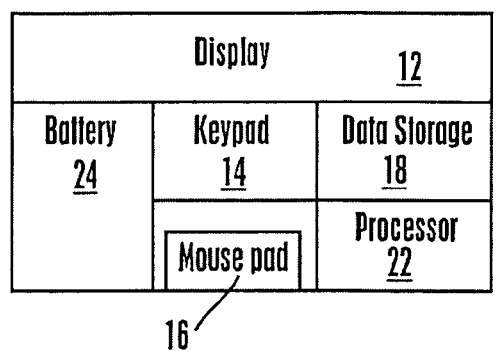
FIG. 1 is a block diagram in accordance with one non-limiting embodiment of a laptop computer using a battery.

Beginning initially with FIG. 1, a non-limiting embodiment of a portable computer 10 such as a laptop computer or notebook computer or personal digital assistant or mobile telephone is shown. While FIG. 1 shows a computer application for present principles, as discussed below other applications are envisioned, including motor vehicle applications.

The computer 10 has a display 12 capable of presenting electronic images to a user. The computer 10 also includes a keypad 14 and mouse pad 16 capable of receiving data input from a user. Further, the computer 10 includes data storage 18 capable of storing data and at least one processor 22 capable of executing logic. The computer 10 also has a preferably high powered battery 24 such as but not limited to a Lithium-ion battery which provides power to the computer 10.

Figure 2:
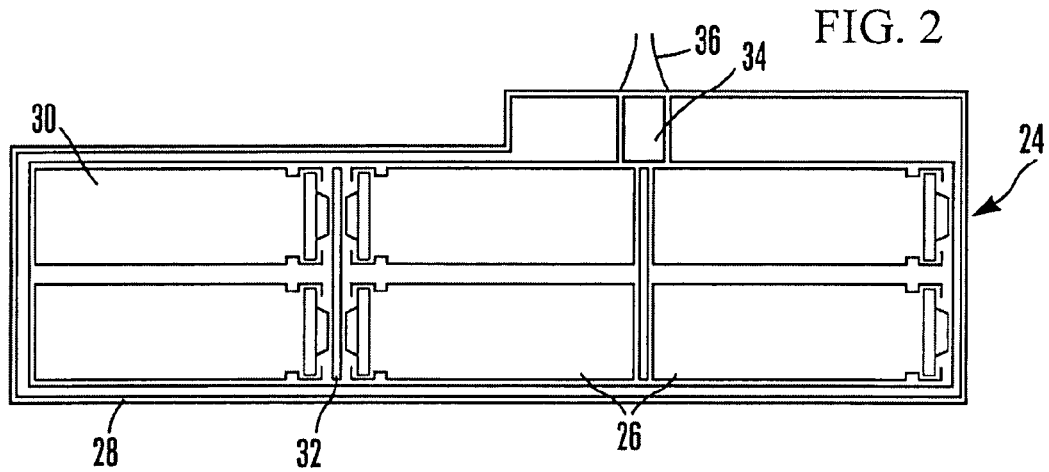
FIG. 2 is a schematic side view of a non-limiting embodiment of a battery with plural battery cells.

Moving to FIG. 2, the battery 24 has plural battery cells 26 and an outer casing 28 holding the cells 26. The battery 24 also has a mesh 30 that at least partially surrounds the cells 26, providing support and containing various parts of the cells 26 should a cell explode or rupture. The mesh 30 may be both heat and fire resistant. Furthermore, the mesh preferably is porous to gas emitted by the cells such that the gas can pass through the mesh to the casing 28. Further, the mesh 30 may electrically insulate the cells 26 in non-limiting embodiments. Also in non-limiting embodiments, the mesh 30 may be composed of high strength glass fiber mat, carbon fiber mat or metal grate.

FIG. 2 also shows one or more thermal barriers 32 that may be disposed between adjacent cells 26. In one embodiment the thermal barrier is established by at least one ceramic plate.

Further, in the example embodiment shown at least one pressure relief feature 34 is associated with the casing 28. The pressure relief feature 34 permits gas to pass through the casing 28 when pressure in the casing 28 exceeds a threshold. In some embodiments the pressure relief feature 34 may be established by a one-way pressure relief valve. In other embodiments the pressure relief feature may be established by a weakened portion of the casing wall, e.g., a portion of the casing wall that is thinner than other portions of the casing wall.

Further still, the pressure relief feature 34 may be connected to an exhaust pipe 36. The pipe 36 directs gas emerging through the pressure relief feature 34 to an intended location, for instance, to the exhaust system of a vehicle when the battery is used in automotive applications. Thus in one non-limiting implementation, if the battery 24 were a vehicle battery, the exhaust pipe 36 may connect to the vehicle's engine exhaust system so that gas from the battery 24 may be expelled from the vehicle.

Figure 3:
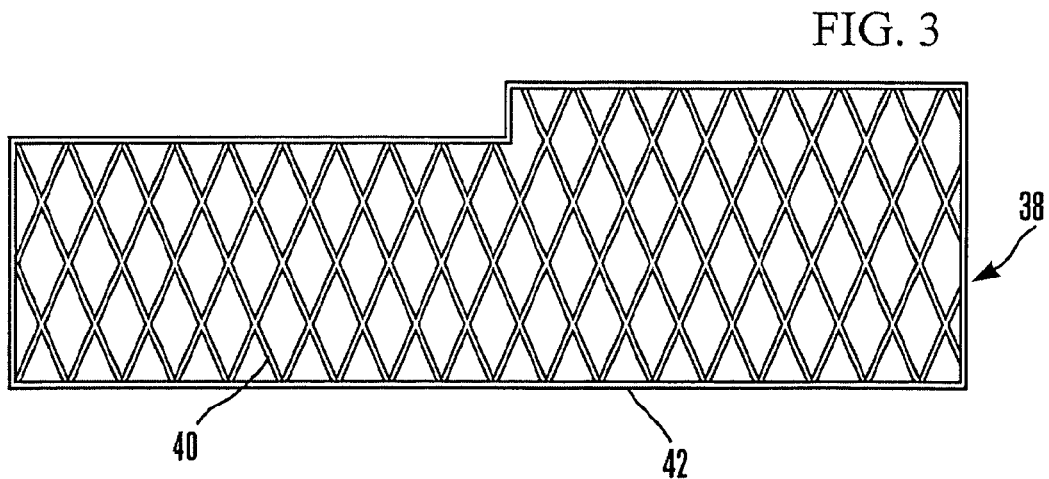
FIG. 3 is a schematic side view of a non-limiting embodiment of a battery with a mesh overmolded onto an outer casing of a battery.

Now referencing FIG. 3, a non-limiting embodiment of an alternate mesh that is overmolded in a battery casing is shown. A battery 38 has a mesh 40, with the mesh 40 being overmolded or embedded onto a casing 42 in a crisscross pattern in the non-limiting embodiment shown in FIG. 3. It is to be understood that the mesh 40 in all other essential respects is substantially similar in function and structure to the mesh 30 set forth above.

As already mentioned in reference to FIG. 3, the mesh 40 may be overmolded or embedded into the casing 42. It is to be understood that the mesh 40 may be overmolded or embedded in only part of the casing 42. However, in certain non-limiting embodiments the mesh 40 may also be overmolded or embedded in the entire casing 42.

Figure 4:
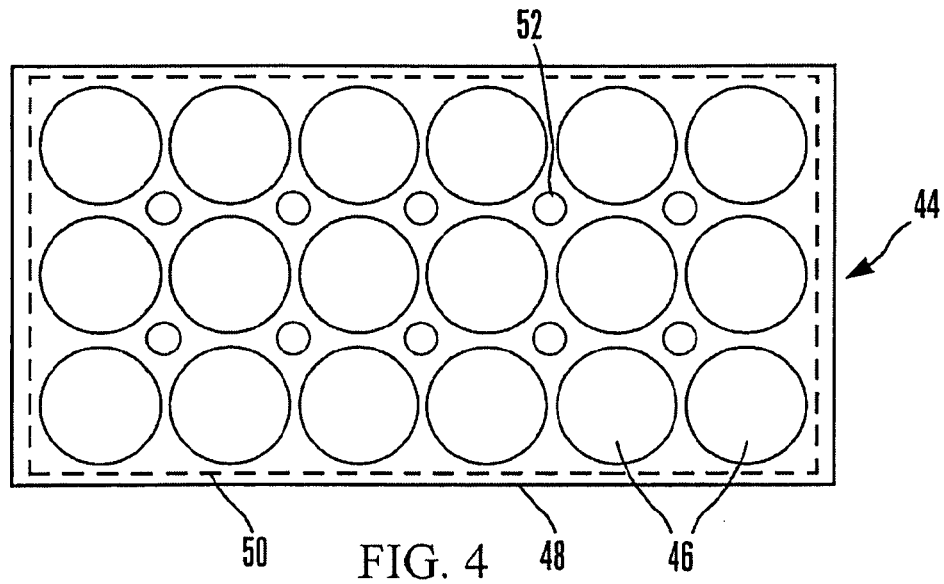
FIG. 4 is a schematic top view of a non-limiting embodiment of a vehicle battery with a preventative mesh and at least one pressure relief feature.
Figure 5:
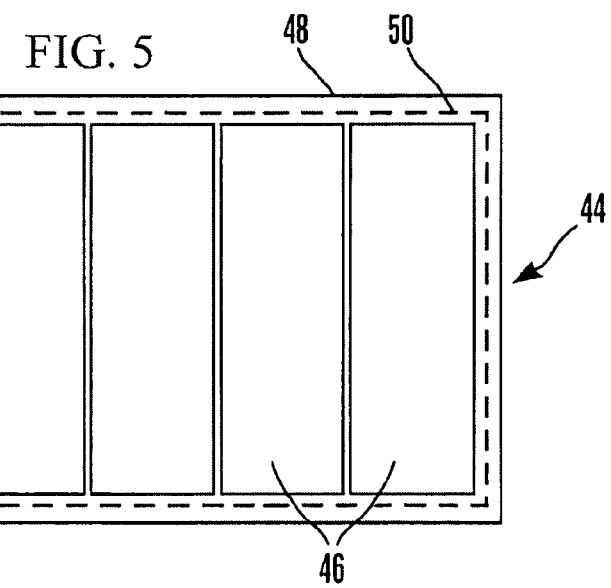
FIG. 5 is a schematic side view of a non-limiting embodiment of a vehicle battery with a preventative mesh and at least one pressure relief feature.

Moving on to FIGS. 4 and 5, a non-limiting application of the present invention as applied to a vehicle battery is shown. A battery 44 has plural cells 46 and an outer casing 48 holding the cells 46. The battery also includes a mesh 50 represented in FIG. 4 by dotted lines along the cell 46 periphery. It is to be understood that the mesh 50 is substantially similar in function and structure to the mesh 30 set forth above.

As best shown in FIG. 4, the battery 44 also includes pressure relief features 52. The pressure relief features 52 are arranged to permit gas to pass through the casing 48 and out of the battery 44 when pressure in the casing 48 exceeds a threshold. Further, the pressure relief feature 52 may in non-limiting embodiments be a one-way pressure relief valve and may also be connected to an exhaust pipe not shown. The exhaust pipe may then be connected to the vehicle's engine exhaust system to carry gas away from the battery 44.

Figure 6:
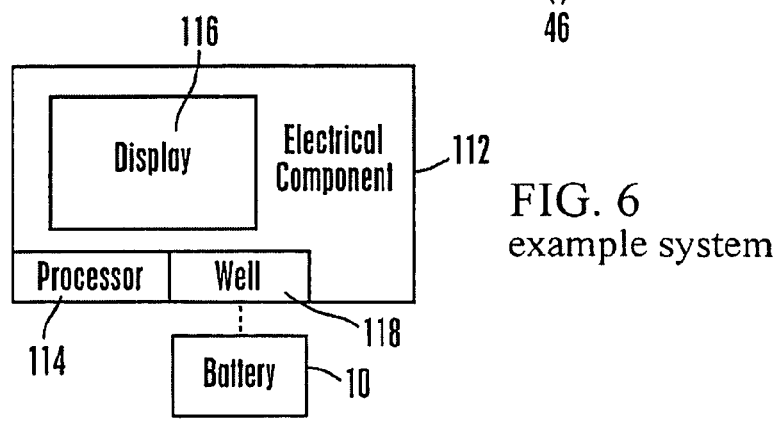
FIG. 6 is a block diagram of a general embodiment.

FIG. 6 shows that the present battery may be removably engaged with an electronic component 112 such but not limited to a notebook computer, wireless telephone, vehicle electric system, etc. to power internal parts thereof such as a processor 114, visual display 116, etc. Typically the battery 10 is engaged with a battery well or receptacle 118 of the component 112. The battery 10 may be rechargeable and may be a Lithium-ion battery.

While the particular BATTERY CELL CONTAINMENT AND VENTING is herein shown and described in detail, it is to be understood that the subject matter which is encompassed by the present invention is limited only by the claims.

What is claimed is:

1. A battery, comprising:
    at least one battery cell, the battery cell including a first end defining a closed periphery, the battery cell including a second end defining a closed periphery, the first and second ends being spaced from each other and being parallel to each other but not being coplanar with each other, the battery cell including an enclosing wall connecting the ends and contiguous to the closed peripheries entirely around the closed peripheries;
    an outer casing holding the battery cell; and
    a mesh at least one of overmolded onto at least part of the enclosing wall and embedded onto at least part of the enclosing wall, the mesh being porous to gas emitted by the battery cell such that the gas can pass through the mesh to the casing.

2. The battery of claim 1, wherein the casing has at least a first portion and a second portion, the first portion being structurally weaker than the second portion at least in part based on the first portion being thinner than the second portion to establish at least one pressure relief feature of the battery arranged to permit gas to pass through the casing when pressure in the casing exceeds a threshold.

3. The battery of claim 1, further comprising at least one pressure relief feature arranged to permit gas to pass through the casing when pressure in the casing exceeds a threshold, the pressure relief feature established by at least one pressure relief valve.

4. The battery of claim 3, wherein the valve is a one-way valve.

5. The battery of claim 3, wherein the battery is disposed in a motor vehicle; and wherein the pressure relief feature is connected to an engine exhaust system of the motor vehicle, the exhaust system directing gas emerging from the pressure relief feature to an intended location.

6. The battery of claim 1, further comprising at least one thermal barrier disposed between at least two adjacent battery cells.

7. The battery of claim 6, wherein the thermal barrier is disposed between ends of at least two adjacent battery cells and includes at least one ceramic plate.

8. The battery of claim 1, wherein the battery is disposed in a computer.

9. The battery of claim 1, comprising only one battery cell, wherein the mesh surrounds the enclosing wall.

10. The battery of claim 9, wherein the mesh is disposed along the entire outer area of the enclosing wall.

11. The battery of claim 1, wherein the mesh is disposed along at least a portion of the enclosing wall of plural respective battery cells.

12. The battery of claim 1, wherein the mesh surrounds the at least one battery cell entirely around the first and second ends and the enclosing wall.

13. A battery, comprising:
    a battery casing holding at least one battery cell, the casing having:
    a first end defining a closed periphery, a second end defining a closed periphery, and an enclosing wall connecting the ends and contiguous to the closed peripheries entirely around the closed peripheries, wherein the first and second ends are spaced from each other and are parallel to each other but are not coplanar with each other; and
    a mesh material at least one of overmolded onto at least part of the enclosing wall and embedded onto at least part of the enclosing wall.

14. The battery of claim 13, where the mesh is wrapped at least partially around battery cells contained in the battery.

15. The battery of claim 13, where the mesh is one of glass fiber mat and carbon fiber mat.

16. The battery of claim 13, where the mesh substantially prevents expulsion of battery components through the mesh.

17. The battery of claim 13, further comprising at least one relief feature capable of allowing gas to pass from at least one battery cell through the battery casing when gas pressure exceeds a threshold, where the relief feature opens upon sufficient buildup of gas pressure in the battery casing.

18. A method, comprising:
    constraining a battery cell within a casing using structure within the casing in addition to a housing within the casing for the battery cell, wherein the casing includes a first end defining a closed periphery, a second end defining a closed periphery, and an enclosing wall connecting the ends and contiguous to the closed peripheries entirely around the closed peripheries, wherein the first and second ends are spaced from each other and are parallel to each other but are not coplanar with each other, the structure at least partially disposed along at least a portion of the enclosing wall and comprising a mesh at least one of overmolded onto at least a portion of the enclosing wall and embedded onto at least a portion of the enclosing wall; and
    providing a gas vent through the casing.

19. The method of claim 18, wherein the battery cell is constrained by the mesh.

20. The method of claim 18, wherein the gas vent is provided by a pressure relief feature.

21. The method of claim 18, comprising engaging the battery casing with a vehicle; wherein the vent is connected to an exhaust system of the vehicle, the exhaust system directing gas emerging from the vent to an intended location.

22. An apparatus, comprising:
at least two battery cells, each battery cell defined by opposed cell ends and at least one cell side extending between the cell ends and connecting the cell ends;
an outer casing holding the battery cells, the casing having opposing casing ends and comprising a mesh at least one of overmolded onto at least a portion of the casing and embedded onto at least a portion of the casing;
at least one pressure relief feature including at least one portion at least partially disposed between at least two battery cells to permit gas to pass between the battery cells and through the casing when pressure in the casing exceeds a threshold.

23. The apparatus of claim 22, wherein the casing has at least a first portion and a second portion, the first portion being structurally weaker than the second portion at least in part based on the first portion being thinner than the second portion to in part establish the pressure relief feature.

24. The apparatus of claim 22, wherein the pressure relief feature includes at least one pressure relief valve.

25. The apparatus of claim 24, wherein the valve is a one-way valve.

26. The apparatus of claim 22, wherein the mesh surrounds at least one battery cell, and wherein the mesh is fire resistant.

27. The apparatus of claim 22, wherein the mesh is juxtaposed next to at least one battery cell to contain cell parts should the battery cell explode, the mesh juxtaposed next to the at least one battery cell such that the mesh is at least partially disposed along at least one cell side.

28. The apparatus of claim 22, comprising at least four battery cells arranged such that a cell side of each respective battery cell of the four battery cells establishes part of a first gas channel defining the portion, the first gas channel extending between the four cells along the respective cell sides of each battery cell establishing the first gas channel, the first gas channel forming at least part of the pressure relief feature.

29. The apparatus of claim 28, comprising at least six battery cells arranged such that a cell side of each respective battery cell of a first battery cell, a second battery cell, a third battery cell, and a fourth battery cell establish part of the first gas channel, and wherein a cell side of each respective battery cell of the third battery cell, fourth battery cell, a fifth battery cell, and a sixth battery cell establish part of a second gas channel extending between the third battery cell, fourth battery cell, fifth battery cell, and sixth battery cell along the respective cell sides of the third battery cell, fourth battery cell, fifth battery cell, and sixth battery cell, the second gas channel also forming at least part of the pressure relief feature.

* * * * *